(12) United States Patent
Muthusamy et al.

(10) Patent No.: US 12,655,911 B2
(45) Date of Patent: Jun. 16, 2026

(54) ANTI-STATIC SPIRAL SPRING FOR VALVE

(71) Applicant: Bray International, Inc., Houston, TX (US)

(72) Inventors: Madankumar Muthusamy, Coimbatore (IN); Satish Shewale, Houston, TX (US); Vasanthakumar Chinnadurai, Dindigul (IN); Patrick O'Connell, Houston, TX (US)

(73) Assignee: Bray International, Inc., Houston, TX (US)

( * ) Notice: Subject to any disclaimer, the term of this patent is extended or adjusted under 35 U.S.C. 154(b) by 0 days.

(21) Appl. No.: 18/802,897

(22) Filed: Aug. 13, 2024

(65) Prior Publication Data

US 2026/0049663 A1 Feb. 19, 2026

Related U.S. Application Data

(60) Provisional application No. 63/520,445, filed on Aug. 18, 2023.

(51) Int. Cl.
F16K 1/22 (2006.01)

(52) U.S. Cl.
CPC ........ F16K 1/22 (2013.01); *F16K 2200/3051* (2021.08)

(58) Field of Classification Search
CPC ........... F16K 2200/30; F16K 2200/305; F16K 2200/3051; F16K 1/22; F16K 1/221
See application file for complete search history.

(56) References Cited

U.S. PATENT DOCUMENTS

| | | |
|---|---|---|
| 5,294,097 A | 3/1994 | Thomsen et al. |
| 2019/0140434 A1 | 5/2019 | Gibson |

FOREIGN PATENT DOCUMENTS

| | | |
|---|---|---|
| CN | 108488285 A | 9/2018 |
| EP | 2998608 A1 | 3/2016 |
| EP | 3741986 A1 | 11/2020 |
| WO | 2015072472 A1 | 5/2015 |

OTHER PUBLICATIONS

Grunfeld, David, PCT International Search Report for PCT/US2024/042105, Nov. 13, 2024, 6 pages, European Patent Office, The Netherlands.
Grunfeld, David, PCT Written Opinion for PCT/US2024/042105, Nov. 13, 2024, 6 pages, European Patent Office, The Netherlands.

*Primary Examiner* — Kelsey E Cary
(74) *Attorney, Agent, or Firm* — Oathout Law Firm; Laura Tu; Mark A. Oathout

(57) ABSTRACT

The disclosure relates to a spring for a rotating valve, having a spring body, wherein the spring body is coiled; an innermost section of the spring body, wherein the innermost section has an inner protuberance; an outermost section of the spring body, wherein the outermost section has an outer protuberance; wherein the spring is constructed of a conductive material and configured to remove electrostatic discharge from the rotating valve.

19 Claims, 8 Drawing Sheets

ANTI-STATIC SPIRAL SPRING FOR VALVE

BACKGROUND

Technical Field: The disclosure relates to the field of antistatic or anti-static features for valves.

All human bodies produce electrostatic discharge (hereinafter, also "ESD") which can affect the safety of valve operations. In valve applications, including critical and flammable applications particularly in the chemical industry, ESD which is uncontrolled or unaccounted for, can and has caused explosions and industry accidents. Thus, many valves now require anti-static features that ensure electrical continuity between the valve shaft, body, and obturator. The anti-static features function to eliminate, reduce or mitigate ESD from the valve to the required standardized thresholds and increases the safety and reliability for the valve operation. These requirements are often reflected in established global or international standards to ensure the safety when using the valve equipment. By way of example only, the American Petroleum Institute (API) in API 609 Section 7.3 states " . . . the resistance shall have electrical continuity across the discharge path with a resistance not exceeding 10 ohms as measured using a dc power source not exceeding 12 volts"; and German standards under NE 167 Section 6.1 require "The discharge resistance between any part of the component (including attachments) and the piping line shall be <10 Ohm for metallic components and $<10_6$ Ohm for plastic-lined metallic components . . . " Many other countries follow these standards as described above.

Conventional anti-static devices have taken many forms, but each have had their own limitations. These conventional anti-static devices include grounding washers which rely on compression to establish the necessary anti-static contact—thus if there is insufficient compression, there is also insufficient contact for electrical conduction and the anti-static capability will not function (which is a critical feature for safety, as mentioned above). These grounding washers may also be unreliable as they often rely on teeth which may bend during installation or assembly. Previous anti-static devices have also relied on conical springs, as placed at the bottom of the shaft or stem—for these devices, the conical spring can interfere with the vertical movement of the shaft, and may affect the overall performance of the valve by pushing the shaft upwards. Conventional anti-static devices also typically only have one contact point between the anti-static device and the shaft, and only one contact point between the anti-static device and the valve body. Anti-static devices with single contact points are unreliable as any lack of or break in contact on a single contact point destroys the necessary electrical conduction route for removal of ESD and negates the anti-static functionality.

Accordingly, there is a need for an improved anti-static device which is robust, reliable, ensures positive contact to establish electrical continuity, and does not detrimentally affect the valve performance.

BRIEF SUMMARY

The disclosure relates to a spring for a rotating valve, having a spring body, wherein the spring body is coiled; an innermost section of the spring body, wherein the innermost section has an inner protuberance; an outermost section of the spring body, wherein the outermost section has an outer protuberance; wherein the spring is constructed of a conductive material and configured to remove or ground electrostatic discharge from the rotating valve.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
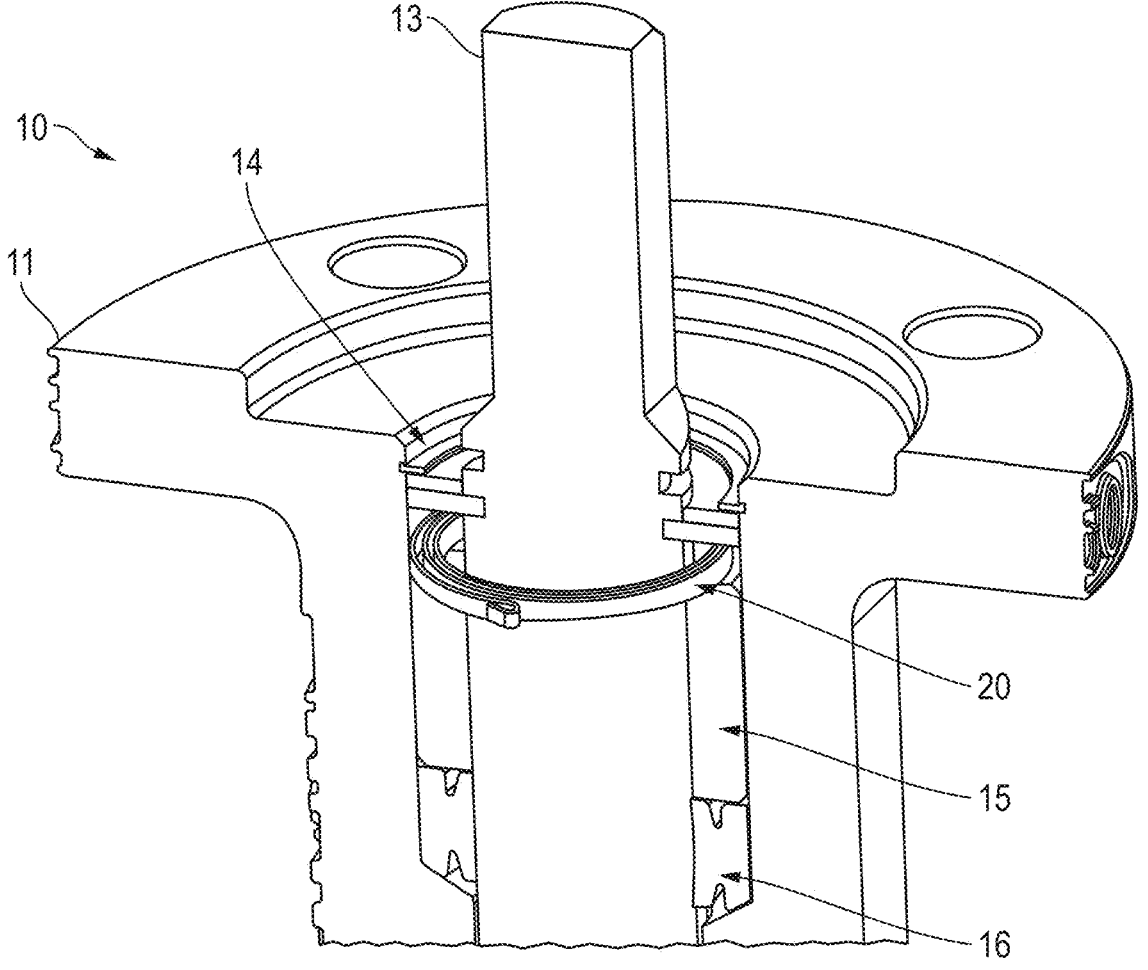
FIG. 1 depicts a front cross-section view of an exemplary embodiment of a valve with an installed anti-static spiral spring.

FIG. 1 depicts a front cross-section view of an exemplary embodiment of a valve 10 with an installed anti-static spiral spring or spring 20. An enlarged front view of an exemplary embodiment of a valve 10 with an installed anti-static spiral spring 20, wherein the body 11 of the valve 10 is shown in cross-section, is provided in FIG. 3. Although the exemplary embodiments of the anti-static spring 20 are depicted in the FIGS. 1, 3-4 and 6 with a butterfly valve 10, it is to be appreciated that the present disclosure encompasses embodiments of the anti-static spring 20 as used on any type of rotating valve 10 where anti-static functionality is desired, including, but not to be limited to: ball valves, any quarter-turn valves, any valves where electrical continuity is desired between the shaft 13 to the valve body 11, and butterfly valves that are rubber seated, concentric, double off-set, or triple-offset, amongst others.

The valve 10 has a valve body 11 wherein a rotating shaft or stem 13 is connected to and controls an obturator (not shown). Through the shaft 13, the obturator can be rotated between an open and a closed position of the valve 10 which allows or prevents, respectively, flow of valve media through an opening of the valve body 11.

Figure 3:
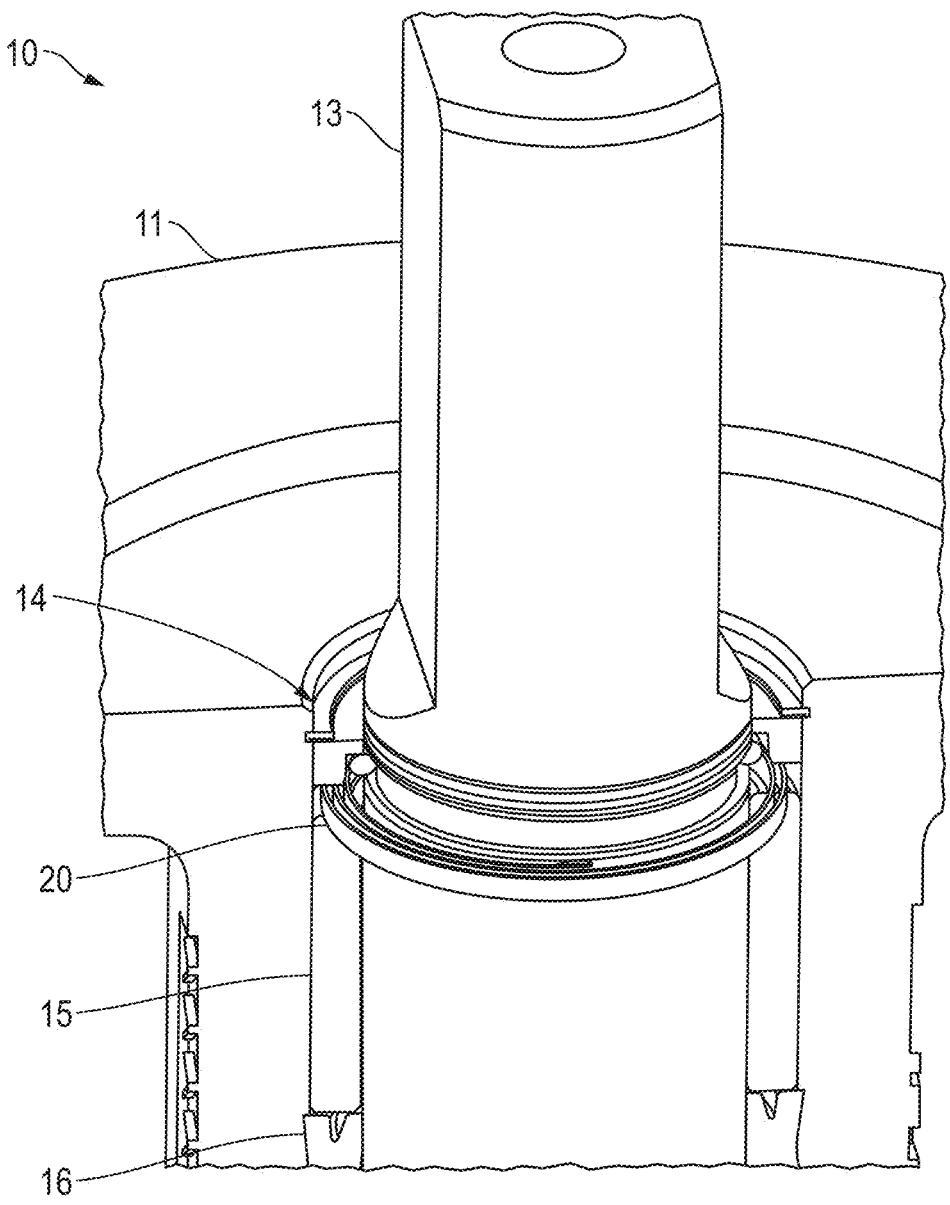
FIG. 3 depicts an enlarged front view of an exemplary embodiment of a valve with an installed anti-static spiral spring, wherein the body of the valve is shown in cross-section.
Figure 4:
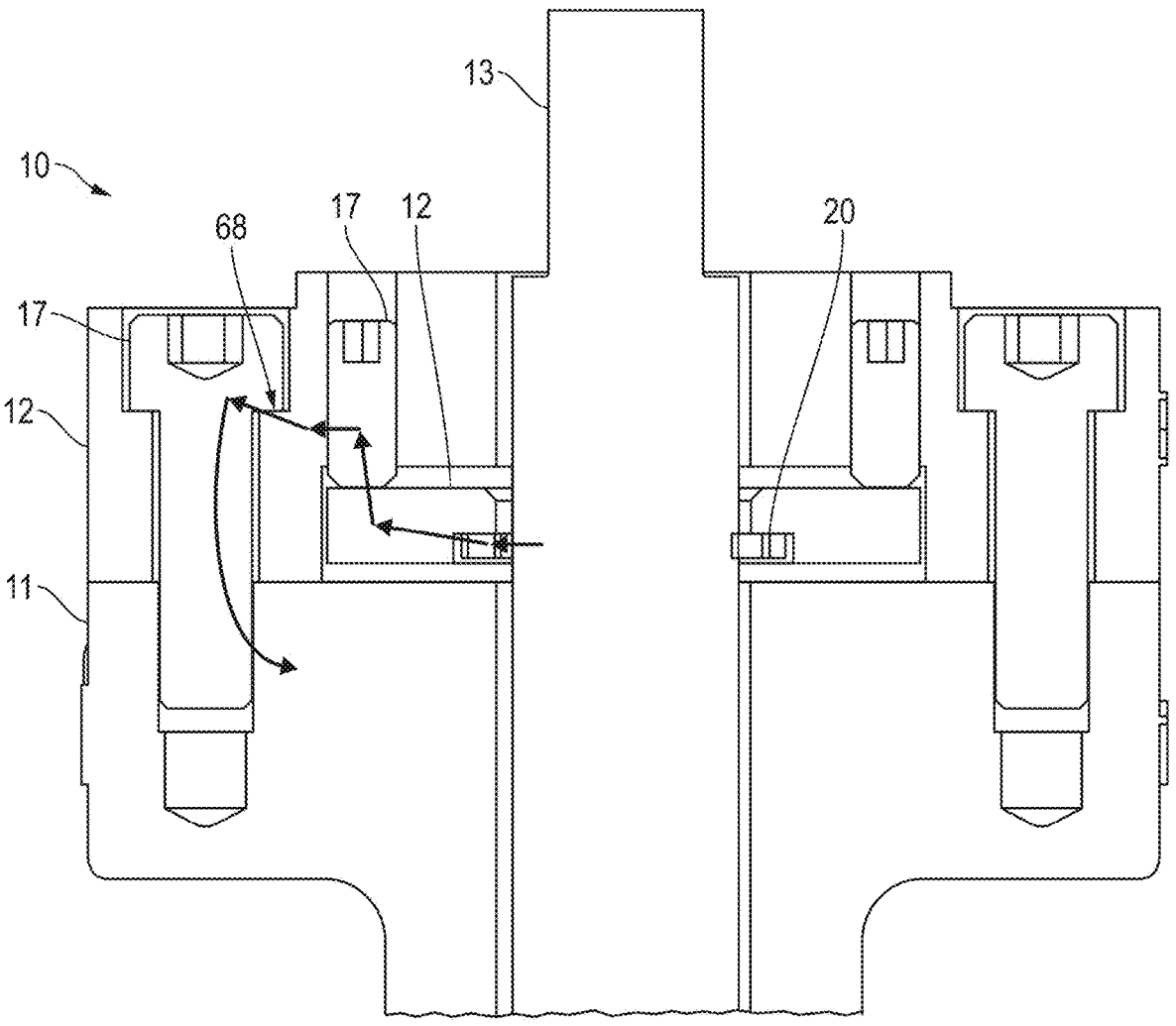
FIG. 4 depicts a front cross-section view of an alternative exemplary embodiment of a valve with an installed anti-static spiral spring, wherein the anti-static spiral spring is indirectly connected to the valve body and a schematic of an exemplary embodiment of an electroconductive route as overlaid onto the valve.
Figure 6:
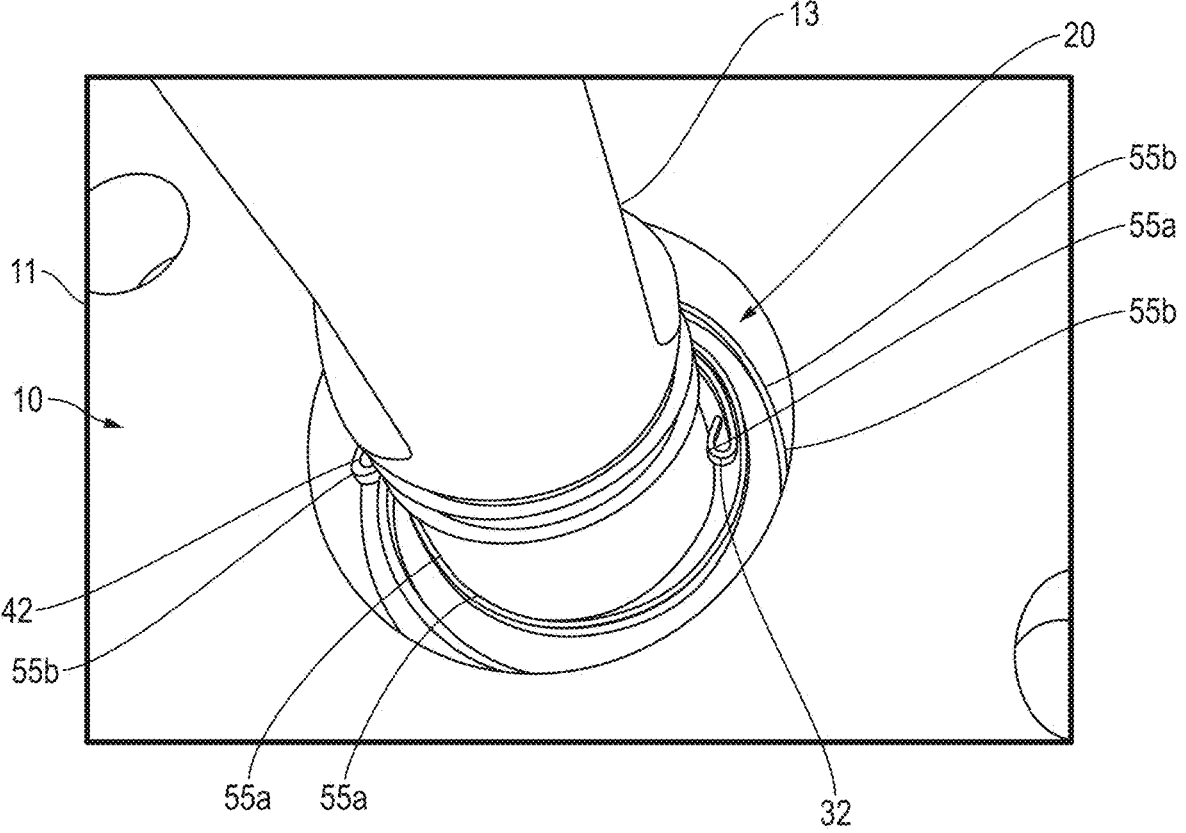
FIG. 6 depicts a top view of an exemplary embodiment of a valve having an installed anti-static spiral spring, wherein the top washers are removed.

The anti-static spiral spring 20 is mounted or installed onto the stem or shaft 13, such that the anti-static spiral spring 20 surrounds or is wrapped around the outer surface or diameter or circumference of the shaft 13. In the exemplary embodiments as shown in FIGS. 1,3, and 6, the spiral spring 20 lies or sits between the shaft 13 and the body 11 of the valve 10, unfixed to the shaft 13 and unfixed to the body 11 and free-floating. The exterior surface 52 of the spring body 21 contacts the valve body 11, and the interior surface 50 of the spring body 21 contacts the shaft 13. In alternative exemplary embodiments, as shown in FIG. 4, the anti-static spiral spring 20 may connect or contact directly to the shaft 13 and be connected indirectly to the body 11, through one or more conductive intermediate or connector pieces 12 which are directly or indirectly connected to the valve body 11. One or more intermediate pieces 12 may connect the exterior surface 52 of the spring body 21 to the valve body 11, so long as each of the intermediate pieces 12 are electrically conductive and form a continuous link between the spring 20 to the valve body 11. Metal or electroconductive fasteners 17 which secure parts of the valve 10 together may be an example of an intermediate piece 12. FIG. 4 also depicts one exemplary embodiment of a schematic of a possible electroconductive route 68 as overlaid onto the valve 10 with an installed antistatic spring 20, wherein the electroconductive route 68 is shown traversing from the stem 13, through the spring 20, the intermediate pieces 12, the fasteners 17, and the valve body 11. A grounding device 60 (not shown in FIG. 4, but depicted in FIG. 7) is connected to the valve body 11, and is used to safely dispel the ESD away from the valve 10.

As shown in FIGS. 1 and 3, beneath the spring 20 and installed around the shaft 13 may be bushings 15, a stem seal 16. Retaining ring(s) or washers, and other blow out prevention devices 14 may be placed around the shaft 13 and above the spring 20. Other conventionally known stem 13 materials, including any packing, split washers, Belleville washers, gland rings or gland washers, gland retainers, thrust washers, and the like may be used around the stem 13 area, above or below the spring 20, as is known to one of ordinary skill in the art. Some stem 13 materials such as a gland retainer, in certain exemplary embodiments may also be a connector or intermediate piece 12.

Figure 2:
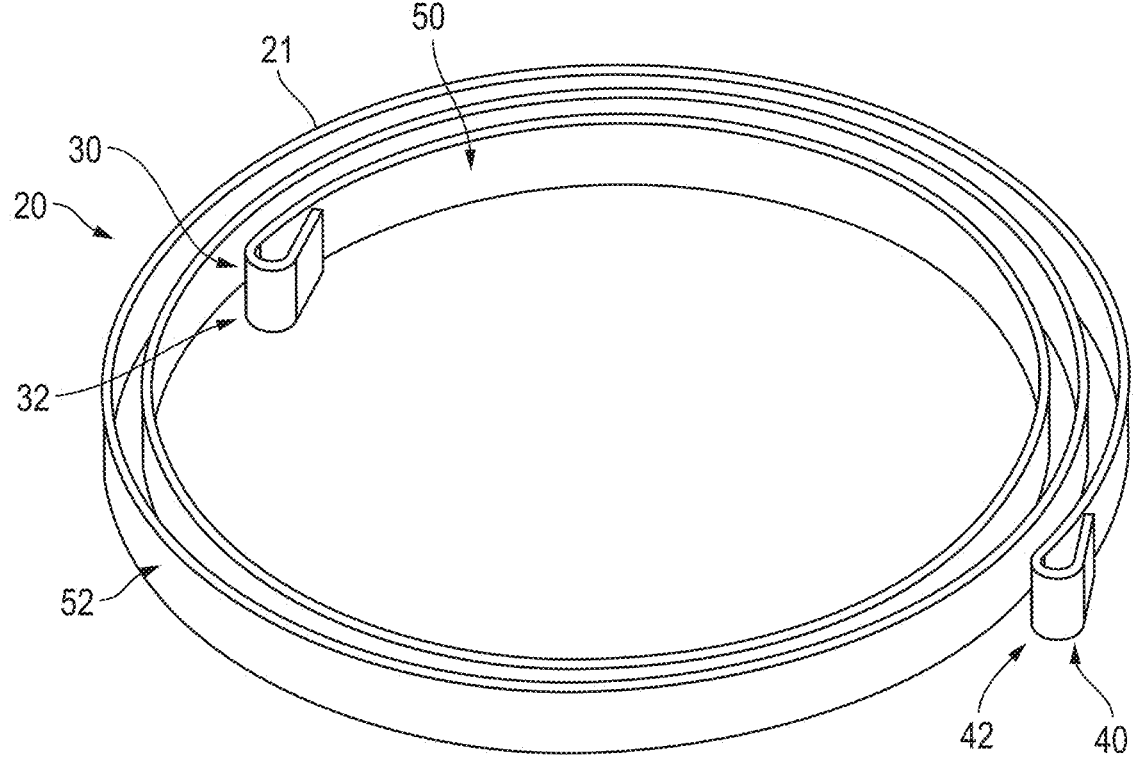
FIG. 2 depicts a front isometric view of an exemplary embodiment of an anti-static spiral spring for a valve.
Figure 5A:
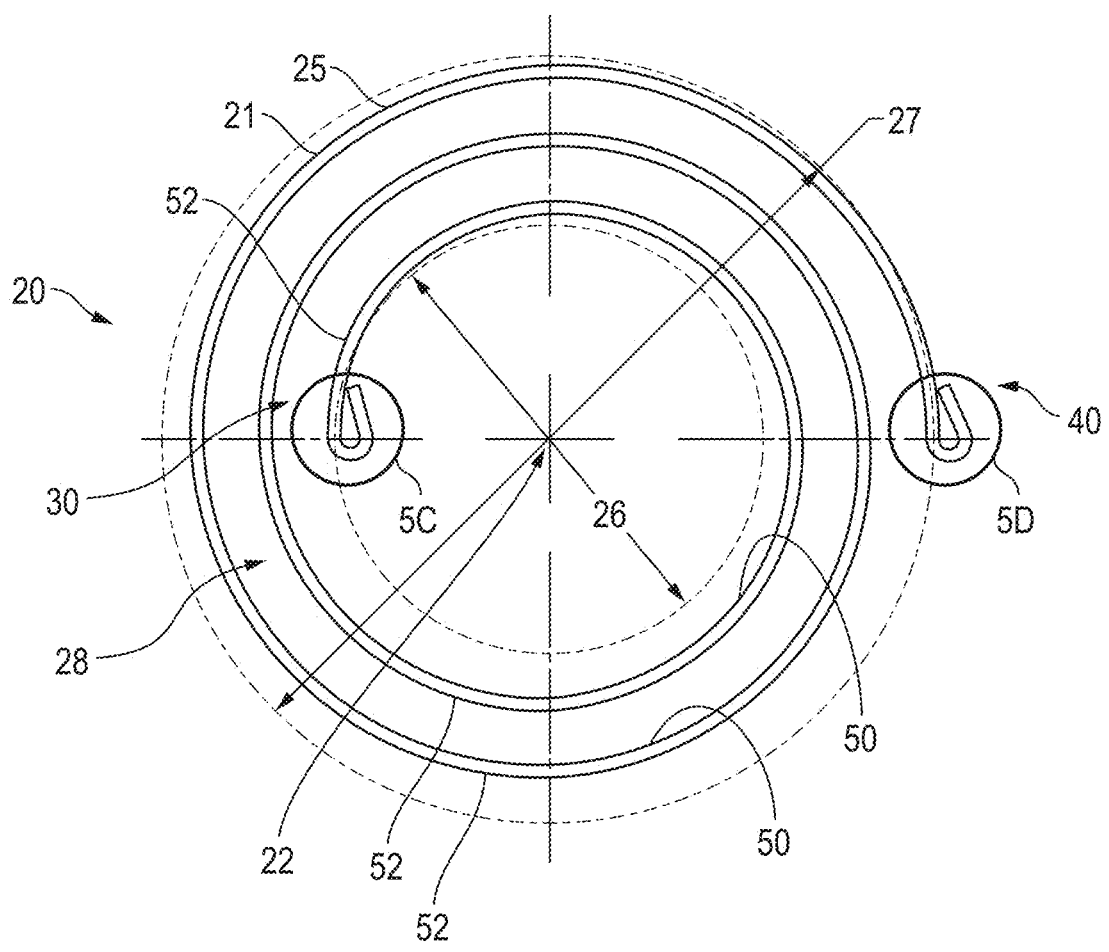
FIG. 5A depicts a top view of an exemplary embodiment of an anti-static spiral spring for a valve.

FIG. 2 depicts a front isometric view of an exemplary embodiment of the anti-static spring 20 and FIG. 5A depicts a top view of same. The anti-static spiral spring 20 has a spring body 21 constructed of a strip or length of a conductive material, preferably resistant to corrosion, as coiled into a flat spiral shape or form. In certain exemplary embodiments, this material may be stainless steel, although other conductive materials are encompassed within the scope of this disclosure. The spring body 21 has or joins a first, innermost or inner, end section 30 of the spring 20 and a second, outermost, or outer, end section 40 of the spring 20. The spring body 21, as depicted in the figures, e.g. FIG. 5A, is unitary with the end sections 30, 40. The spring body 21, including the end sections 30, 40, define a spring length 25 which is coiled or spiraled around a center 22 of the spring 20. The end sections 30, 40 are unfixed, unpinned, and free-moving. Accordingly, the spring 20 is free-moving or free floating between the stem 13 and the valve body 11. The spring 20 may have two (2) to three (3) coils or turns 28 along its length 25 in a preferred range; in another preferred exemplary embodiment, as shown in FIG. 5A, the spring 20 has 2.5 coils or turns 28. By way of example only and not to be limited to, the spring 20 may have a spring constant, k, in the range of 9.17 to 35.36 N*mm/rad (or Newton millimeter per radian). By way of further example and not to be limited to, the spring 20 may also have a force per full turn, $F_p$, in the range of 1.48 to 18.36 N (or Newtons). The selected number of coils or turns 28 ensures that the spring force is acting at all times for proper redundant contact points 55a, 55b without any unnecessary or unneeded amount of turns 28 due to limited space available in the valve 10.

As seen from the top view in FIG. 5A, the anti-static spiral spring 20 may have an inner diameter 26, at least partially defined by the innermost coiling of the spring 20, and an outer diameter 27, which is at least partially defined by the outermost coiling of the spring 20, and wherein the spiral spring 20 completes the desired number of coils or turns 28 between the inner diameter 26 and the outer diameter 27. The thickness 24 of the strip or body 21 of the spring 20 is shown in FIGS. 5C and 5D, and can be defined as the distance between the interior surface 50 of the spring 20 and the exterior surface 52 of the spring 20.

In an exemplary embodiment, by way of example only and not to be limited to same, the spring 20 may have a strip width 23 and spring height 29 of 2 millimeters, a thickness 24 of 0.5 millimeters, and length 25 ranging from 142.16 millimeters to 547.82 millimeters. By way of example only and not to be limited to same, the inner diameter 26 may range from 12 to 62 mm (or millimeters) and the outer diameter 27 may range from 24.2 to 78 mm (or millimeters). The particular measurements and size of the spring 20 may vary depending on the type of valve 10 the spring 20 is used in connection with.

Figure 5B:
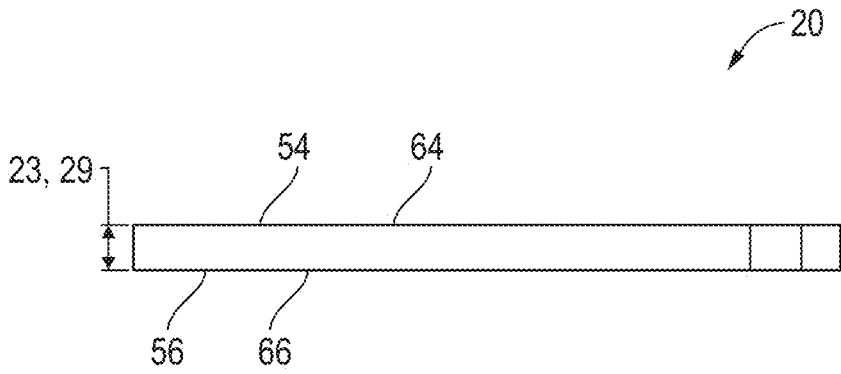
FIG. 5B depicts a side view of the exemplary embodiment of the anti-static spiral spring of FIG. 5A.
Figure 5C:
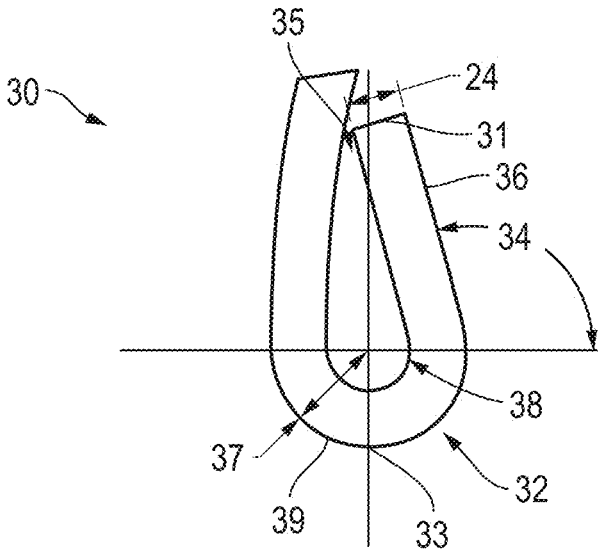
FIG. 5C depicts an enlarged top view as defined by circle 5C in FIG. 5A of the exemplary embodiment of the anti-static spiral spring.
Figure 5D:
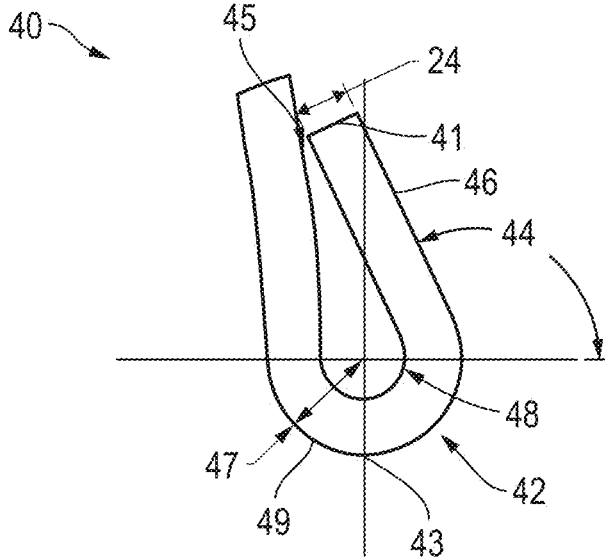
FIG. 5D depicts an enlarged top view as defined by circle 5D in FIG. 5A of the exemplary embodiment of the anti-static spiral spring.

The spring body 21 also has a top surface 54 and a bottom surface 56, as seen in FIG. 5B, which connects the interior surface 50 and exterior surface 52 of the spring 20. The spring 20 also has a top 64 and a bottom 66. As the spring 20 has a flat coil shape or flat spiral shape, the top surface 54 of the body 21 and the bottom surface 56 of the body 21, are the same as the top 64 and bottom 66 of the spring 20, respectively. The strip or body 21 also has a width 23, and the spring 20 has a height 29 as can be seen in FIG. 5B. The width 23 is defined as the distance between the top surface 54 and bottom surface 56 of the body 21 and the height 29 is defined as the distance between the top 64 and bottom 66 of the spring 20. As the anti-static spiral spring 20 is a flat coil shape or flat spiral shape, the width 23 of the strip or body 21 of the spring 20 and height 29 of the spring 20 are the same and consistent throughout the length 25 of the spring 20.

The spring 20 defines a first bend, looping, bump, protuberance, or other interference 32 within the first or inner end section 30, and also defines a second bend, looping, bump, protuberance, or other interference 42 within the second or outer end section 40. The spring body 21 may be crimped, folded, angled, or bent at the first or inner interference or bend 32, wherein the first or inner interference 32 defines a first or inner arm 36 at an angle 34 from the interference or bend radius 37. This first or inner end section angle 34 may be approximately 105° (degrees) in a preferred exemplary embodiment, but other angles 34 are possible and considered within the scope of the present disclosure. The angle 34 is bent for functionally enhancing electrical contact or engagement respectively with the valve shaft 13. Further, the bottom 33 of the first interference or protuberance 32 may form a partial arc, half-circle or semi-circle having a bend radius 37, wherein the first arm 36 is adjacent to the bottom 33 half-circle or arc. While the first interference or protuberance 32 is shown as having a first opening 35 towards the center 22 of the spring 20, wherein the first end section opening 35 is at the interior surface 50 of the spring 20, it is within the scope of the disclosure for the first opening 35 to be facing away from the center 22 of the spring 20, wherein the first end section opening 35 is at or towards an exterior surface 52 of the spring 20. The first or inner end section 30 also includes the first inner end, terminal, or terminus 31 of the spring 20 connected to the arm 36, which may be at the opening 35 or within the bend 32. The first or inner end section 30 defines a first or inner end section interior surface 38, formed or defined as the surface within the bend or interference 32, bounded within the arm 36 and the bottom 33, and a first or inner end section exterior surface 39 of the bend or interference 32 on an opposite side to the interior surface 38. Depending on where the opening 35 of the first bend or interference 32 is facing, the first end section interior surface 38 may be the same as the spring interior surface 50, and the first end section exterior surface 39 may the same as the spring exterior surface 52.

The spring body 21 may be crimped, folded, angled, or bent at the second or outer interference or bend 42, wherein the second or outer interference 42 defines a second or outer arm 46 at an angle 44 from the interference or bend radius 47. This second or outer end section angle 44 may be approximately 115° (degrees) in a preferred exemplary embodiment, but other angles 44 are possible and considered within the scope of the present disclosure. The angle 44 is bent for functionally enhancing electrical contact or engagement respectively with the valve body 11 or connector piece 12. Further, the bottom 43 of the second interference or protuberance 42 may form a partial arc, half-circle or semi-circle having a bend radius 47, wherein the second arm 46 is adjacent to the bottom 43 half-circle or arc. While the second interference or protuberance 42 is shown as having a second opening 45 away from the center 22 of the spring 20, wherein the second end section opening 45 is at the exterior surface 52 of the spring 20, it is within the scope of the disclosure for the second opening 45 to be facing towards the center 22 of the spring 20, wherein the second end section opening 45 is at or towards an interior surface 50 of the spring 20. The second or outer end section 40 also includes the second or inner end, terminal, or terminus 41 of the spring 20 connected to the arm 46, which may be at the opening 45 or within the bend 42. The second or outer end section 40 defines a second or outer end section interior surface 48, formed or defined as the surface within the bend or interference 42, bounded within the arm 46 and the bottom 43, and a second or outer end section exterior surface 49 of the bend or interference 42 on an opposite side to the interior surface 48. Depending on where the opening 45 of the second bend or interference 42 is facing, the second end section interior surface 48 may be the same as the spring exterior surface 52, and the second end section exterior surface 49 may the same as the spring interior surface 50.

While the interferences 32,42 are each shown in the FIGS. 1-6 as a bending of the strip or body 21 into a semi-circle and an angled straight arm 36, 46, other shapes or manipulations of the strip or body 21 are possible and considered within the scope of the disclosure, so long as each of the end sections 30,40 include at least one form of interference, protuberance, or projection means 32,42, respectively, which slightly extends or protrudes from the spiral or coil shape of the body 21 at the desired surface of the body 21 (whether the interior surface 50 or the exterior surface 52 as described above). By way of example only, the interferences 32,42 in alternative exemplary embodiments may each be formed into round or circular shapes.

As depicted in FIG. 6, the eccentricity of the turns or coils 28 of the spiral spring 20 enables spring 20 to have multiple contact points (or contact arc or strip) 55a between the spring 20 and the stem 13, and also multiple contact points (or contact arc or strip) 55b between the spring 20 and the valve body 11. In alternative exemplary embodiments (such as in FIG. 4) the spring 20 has multiple contact points 55a between the spring 20 and the stem 13, and multiple contact points 55b between the spring 20 and an intermediate or connector piece 12. The multiple contact points 55a with of the shaft with spring 20 may be located on opposite sides of the outer surface of the stem 13; the multiple contact points 55b of the valve body 11 or connector 12 with spring 20 may be located on opposite sides of the interior surface of the valve body 11 or connector 12. Such redundancy of contact may be advantageous or even critical due to the operating conditions wherein the shaft or stem 13 is rotating in its normal operational mode, or is moving vertically (e.g., due to pressures or forces within the system) as the end sections 30 and 40 of the spring 20 are unfixed, unpinned, and free-moving.

Figure 7:
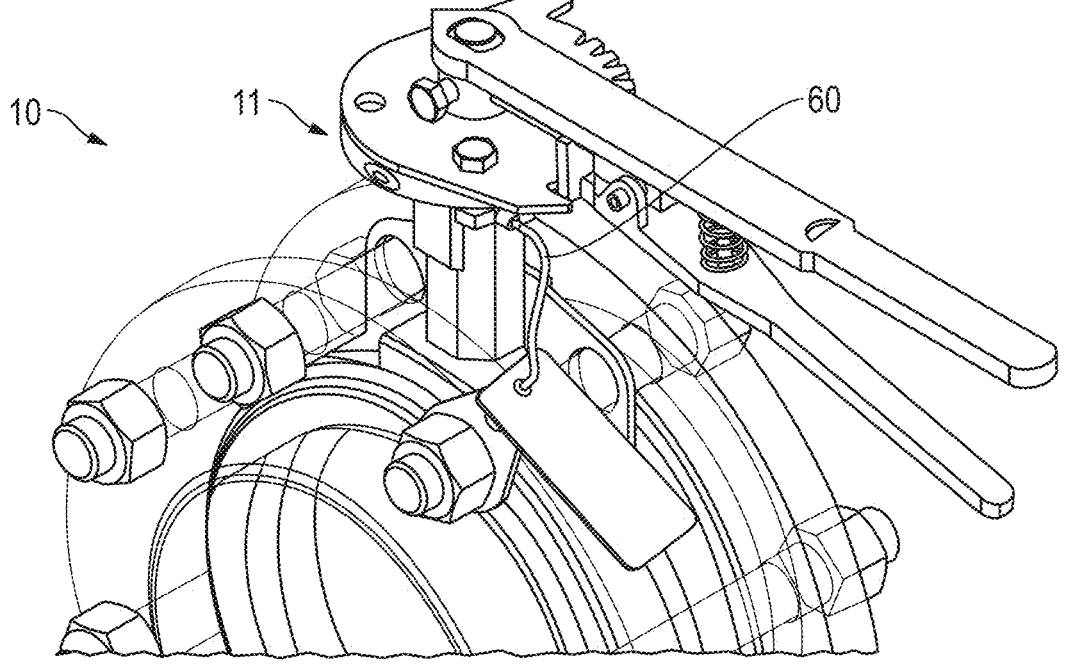
FIG. 7 depicts a top perspective view of an exemplary embodiment of a valve with a grounding device.

A first contact point 55a between the spring 20 and the shaft 13 is via first or inner interference, protuberance, or bend 32. Additional potential contact points 55a, or lengths of contact 55a, between the spring 20 and the shaft 13 lie along the spring body 21 interior surface 50 and the shaft 13 outer surface. Another contact point 55b between the spring 20 and the valve body 11 (or connector piece 12) is via the second or outer interference, protuberance, or bend 42. Additional potential contact points 55b, or lengths of contact 55b, between the spring 20 and the valve body 11 (or connector piece 12) lie along the spring body 21 exterior surface 52 and an interior surface of the valve body 11 or connector piece 12. The contact points or lengths of contact 55a, 55b, as contacted through the first and second interferences 32,42, can be anywhere along the length of the end sections 30,40 including along the arms 36,46 and bottoms 33,43. The aim or purpose of the anti-static spring 20 is to ensure reliable multiple contact points 55a between the spring 20 and the shaft 13, and also multiple contact points 55b between the spring 20 and the valve body 11 or connector piece 12. When electrostatic discharge (ESD) accrues or builds in the valve 10, the spring 20 is able to remove the ESD through the electroconductive route 68 established between the contact points 55a, 55b and the valve 11, connector piece 12, and shaft 13. As depicted in FIG. 7, a grounding device, feature, or wire 60, as known to one of ordinary skill in the art, is connected to the valve body 11, and further, is in electroconductive communication with the spring 20, and acts to safely dispel or dissipate the ESD away from the valve 10. In certain exemplary embodiments, the grounding device 60 may be a grounding washer strap. The redundancy for both sets of contact points 55a, 55b between the spring 20 and the stem 13, and the spring 20 and the valve body 11 (or connector piece 12), respectively, provides a more reliable continuous electrical conductivity route for ESD over existing antistatic devices, thus resulting in a safer workplace environment.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A spring for a rotating valve, comprising:
a spring body of the spring, wherein the spring body is coiled;
an innermost section of the spring body, wherein the innermost section comprises an inner protuberance, wherein the inner protuberance is unfixed to the rotating valve;
an outermost section of the spring body, wherein the outermost section comprises an outer protuberance, wherein the outer protuberance is unfixed to the rotating valve;
wherein the spring is constructed of a conductive material and configured to remove electrostatic discharge from the rotating valve.

2. The spring of claim 1, wherein the inner protuberance comprises an inner bend connected to an inner arm, and wherein the inner arm is bent towards a first interior surface of the innermost section; and wherein the outer protuberance comprises an outer bend connected to an outer arm, and wherein the outer arm is bent towards a second interior surface of the outermost section.

3. The spring of claim 2, wherein the spring body comprises two to three turns or coils.

4. The spring of claim 3, wherein the inner arm is at a first angle from a first radius of the inner bend, and the outer arm is at a second angle from a second radius of the outer bend.

5. The spring of claim 4, wherein the inner bend comprises a first half-circle shape, and wherein the outer bend comprises a second half-circle shape.

6. The spring of claim 5, wherein the spring comprises a flat spiral spring shape.

7. The spring of claim 4, wherein the first angle is 105 degrees from the first radius of the inner bend.

8. The spring of claim 4, wherein the second angle is 115 degrees from the second radius of the outer bend.

9. A valve having a valve body, wherein an obturator within the valve body is rotated by a valve stem, comprising:
a spring having a spring body coiled around the valve stem; wherein the spring is in electroconductive communication with the valve stem and the valve body;
wherein the spring comprises a flat, spiral spring shape;
an inner end section of the spring body;
an outer end section of the spring body;

a first interference defined on the inner end section; and
a second interference defined on the outer end section; and
wherein the spring is free-floating.

10. The valve of claim 9, further comprising a first plurality of contact points between the spring and the valve stem, wherein at least one of the first plurality of contact points is between the first interference and the valve stem.

11. The valve of claim 10, further comprising a second plurality of contact points between the spring and the valve body, wherein at least one of the second plurality of contact points is between the second interference and the valve body.

12. The valve of claim 10, wherein the spring is indirectly connected to the valve body.

13. The valve of claim 12, further comprising at least one conductive connector connected to the valve body, and wherein the spring is directly connected to the at least one conductive connector.

14. The valve of claim 13, further comprising a second plurality of contact points between the spring and the at least one conductive connector, wherein at least one of the second plurality of contact points is between the second interference and the at least one conductive connector.

15. A method for dissipating an electrostatic discharge from a valve having a valve body, comprising the following steps:
providing a spring wrapped around a stem of the valve, wherein the spring is connected to the stem and the valve, and further wherein the spring is free-floating;
wherein the spring comprises two to three coils and comprises a flat spiral spring form;
wherein the spring defines a first protuberance at an innermost section of the spring and a second protuberance at an outermost section of the spring; and
contacting the stem with the spring at the first protuberance, and further contacting the stem with the spring along an interior surface of the spring.

16. The method of claim 15, wherein the first protuberance comprises a first end of the spring bent at a first angle, and wherein the second protuberance comprises a second end of the spring bent at a second angle.

17. The method of claim 16, further comprising the step of dissipating the electrostatic discharge via an electroconductive route established between the spring, the stem, and the valve to a ground.

18. The method of claim 17, further comprising the step of contacting the valve body with the spring at the second protuberance, and further contacting the valve body with the spring along an exterior surface of the spring.

19. The method of claim 17, wherein the valve further comprises at least one connector, wherein the at least one connector is in electroconductive communication with the valve body; and further comprising the step of contacting the at least one connector with the spring at the second protuberance, and further contacting the at least one connector with the spring along an exterior surface of the spring.

* * * * *